June 23, 1936.  R. F. HALL  2,045,463
AIRPLANE
Filed April 16, 1935   2 Sheets-Sheet 2

Inventor
Randolph F. Hall
Attorney

Patented June 23, 1936

2,045,463

UNITED STATES PATENT OFFICE 2,045,463

AIRPLANE

Randolph F. Hall, Rochester, N. Y.

Application April 16, 1935, Serial No. 16,707

22 Claims. (Cl. 244—29)

This invention relates to certain improvements in airplanes and more particularly to the lateral control systems thereof; and the nature and objects of the invention will be readily recognized and understood by those skilled in the aeronautical art in the light of the following explanation and detailed description of the accompanying drawings illustrating what I at present believe to be the preferred embodiments or mechanical and aerodynamic expressions of my invention from among various other forms, arrangements, combinations, and constructions of which the invention is capable within the spirit and the scope thereof.

In a type of lateral control system for aircraft that includes opposite control surfaces located in or adjacent to one side of an aircraft surface and obtaining lateral control by movement of either control surface in one direction relative to the aircraft surface, or by a highly differential movement of the opposite control surfaces, there is encountered an inherent tendency toward instability of the control system under certain flight conditions. A typical example of the general type of control system referred to, provides the opposite lateral control surfaces in the upper side of an airplane wing or other surface, and swings either control surface upwardly for lateral control, with or without an accompanying relatively very small downward movement or deflection of the opposite control surface. Particular expressions and embodiments of the type of lateral control system of the referred to example are disclosed, for instance, in my United States Patents 1,875,593 of September 6, 1932, and 1,992,157 of February 19, 1935, and such patents may be referred to for an exposition of the operation and functioning of such type of lateral control system.

With a lateral control system of the foregoing type in which a lateral control surface is moved or deflected in one direction for lateral control, say in the upward direction relative to a wing or other surface, the airflow over the control surface in flight creates pressure differences establishing a force tending to cause the control surface to adjust itself relative to the wing or other surface on or adjacent to which the control surface is mounted. If this tendency is not counteracted or compensated for, the control system including such a surface may be unstable because the control surface will tend to move the entire control system from a neutral control position, unless the forces acting at the time on the opposite control surfaces are in balance.

In what may be termed at this period in the commercial development of the art, the "usual" or "conventional" lateral control system, consisting of ailerons mounted on opposite wings to form portions of the trailing section of such wings and connected into a control system for swinging the aileron at one side in one direction and the aileron at the opposite side in the reverse direction, there is an up force acting upon the ailerons in neutral position thereof under certain flight conditions, as established by the fact that free floating ailerons will float upwardly to some extent under the same flight conditions. However, in the usual or conventional control arrangements the gearing of or leverages in the system is such that for small movements of the control, the upwardly acting force on the side tending to carry the control in the direction moved is more than counteracted by the force in the opposite side of the system tending to prevent movement, with the result that the control system is stabilized under conditions that tend toward instability in the types of control systems hereinbefore referred to in which control is by movement in one direction of a control surface.

With a lateral control system of the type in which lateral control is obtained mainly or solely by up movement or deflection of a control surface at one lateral side of an aircraft, the arrangement or gearing of the system for small movements of the control will usually be such that the up load or forces thereon under certain conditions of flight for, say, that of the corresponding free floating range of the moved control surface, will tend to move the control system in the direction it is moved to some position slightly away from the neutral position, because of the greater leverage of the moved control surface on the control system. The effect in flight operation and use of the changing forces on the lateral control surface, especially at high speeds of flight, may cause continual slight readjustments in the control system in first one and then the other direction, and while not necessarily critical, results in a peculiar feel in the control when the system is in neutral or nearly neutral control positions. The extent or degree of this tendency will depend of course upon the magnitude of the control surface hinge moment from the airflow action on the surface, but in any event, in actual flight operations with such type of lateral control surface this inherent tendency of the system toward instability and the resulting effect in the feel of the control is a distinct disadvantage and a very undesirable condition that detracts from the utility and efficiency of the type.

My present invention aims to eliminate and remove from the types of lateral control systems referred to, such unstable control system movements and the peculiar and disturbing feel resulting therefrom at the pilot's control member or unit, by counteracting or compensating for the forces acting on the system tending toward system instability in order to thereby stabilize the system to a point or condition at which the control surfaces are maintained against neutral position displacement except by arbitrary pilot operation of the system for control functioning.

One of the objects of the invention is to carry out such control system stabilization through the medium of aerodynamic means included in and functioning with the system in such a manner as to create forces counteracting the unstabilizing forces acting on the system to eliminate or reduce unstable control movements of the system in flight.

A further object and a feature of the invention resides in the provision of such an aerodynamic stabilization in which the aerodynamic means utilized will stabilize the system and prevent small unstable movements of the control surfaces in flight from a neutral control position through a limited range of movement, but which will assist the further movement of a control surface in the control direction away from the neutral position after the control surface has passed through said limited movement range.

Another object of the invention is to provide such aerodynamic stabilizing means in the form of a balance member for the control surface and so designed and mounted as to tend to maintain the lateral control surface of the up-moving control type lowered within a relatively small initial range of up-movement of the surface, but to function to assist in raising the lateral control surface after the surface has passed beyond the relatively small initial range of movement.

A further object of the invention is to provide an arrangement of force means, other than aerodynamic, for a lateral control of the types referred to, which introduces and applies a force tending to maintain the lateral control in its neutral position within a predetermined range of movement of the control, and which after the control has passed beyond such movement range, applies the force in a direction to move the control away from the neutral control position.

Another object resides in providing in a lateral control system a sufficient frictional force to offset or compensate for unstable control movements so as to thereby stabilize the control system against the unstabilizing conditions as hereinbefore referred to.

The invention also includes as an object the provision of a suitable force means applied directly to the pilot's lateral control member or unit of a control system, in such a manner as to counteract and prevent objectionable movements of the pilot's control member or unit caused by unstable conditions in the control system under certain conditions of flight.

As another object and feature the invention provides for the prevention of or reduction in unstable control movements of a lateral control system of the general types under consideration, by the inclusion in the control system of a combination of any two or all of the classes of means for producing and applying forces to the system referred to by the several preceding objects and features of the invention.

With the foregoing general objects, features and results in view, as well as certain others which will be apparent from the following explanation, the invention consists in certain novel features in design and in arrangements and combinations of parts and elements, all as will be more fully and particularly referred to and specified hereinafter.

Referring to the accompanying drawings.

While the problems of lateral control system instability and the undesirable results therefrom as hereinbefore referred to, are sometimes met with in those types of lateral control systems in which lateral control is obtained by the movement in one direction of one of opposite lateral control surfaces, with or without a slight reverse direction movement of an opposite control surface, I have selected as an example for the purpose of explaining the principles of my invention herein, a specific form of such general type of lateral control system as applied to a particular type of high lift wing. Such problems are met with in a high degree in the selected examples of lateral control system and wing, and the principles and results of my invention have been established by actual flight operation and use with these examples, so that they furnish a preferred basis for the description and explanation of my present invention. It is here pointed out, however, that the invention is in no sense limited or restricted to use with or application to the specific form of lateral control system or type of wing shown in the examples hereof, but is broadly applicable to the solution of the problems of control system stability wherever encountered.

Figures 1, 2, 3:
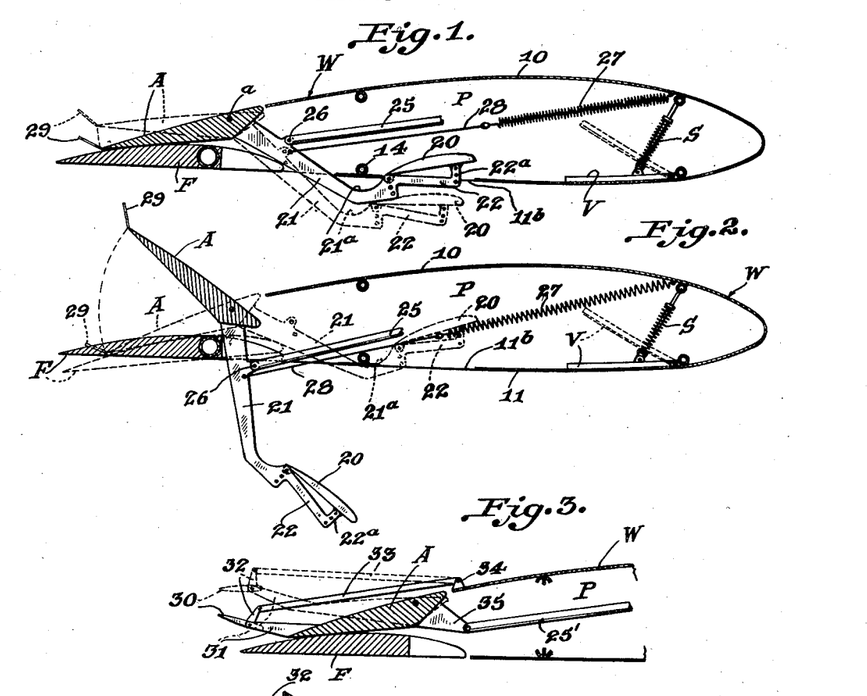
Fig. 1 is a vertical, transverse section, more or less diagrammatic, through a wing of the longitudinal passageway-trailing under flap type having an upper surface aileron with an aerodynamic balance means of my invention for stabilizing the lateral control system in which the aileron is connected; the aileron and balance means being shown in full lines in normal neutral control position and in dotted lines in a position with the aileron in slightly raised position.
Fig. 2 is a transverse vertical section similar to Fig. 1, but showing the aileron and aerodynamic balance means therefor in raised upwardly deflected lateral control position of the aileron in full lines; the position of the aileron and balance means being shown by dotted lines with the aileron lowered or deflected downwardly a slight distance from the normal neutral control position.
Fig. 3 is a vertical transverse section, more or less diagrammatic, through the trailing or rear portion of a wing of the type of Fig. 1, but showing a modified or different form and arrangement form and arrangement of aerodynamic balance means of the invention applied to the upper surface aileron, the aileron and balance means being shown in a normal neutral control position by full lines and in a slightly raised position of the aileron by dotted lines.

The type of wing of the selected example is of the so-called "Hall" high or variable lift design having lateral control surfaces or ailerons located at the upper surface of the wing together with a trailing under surface wing flap, and a control system that obtains lateral control by mainly up movement of an aileron with or without a slight downward movement or deflection of an opposite aileron. Referring particularly to Figs. 1 and 2 of the accompanying drawings, in which such a wing W is more or less diagrammatically disclosed, the wing includes the upper surface 10, the lower surface 11, and the longitudinal air displacement passage P extending rearwardly through the wing from a forward inlet through the under surface 11 controlled by the vane V, to the trailing or rear portion of the wing. A wing lift capacity and under surface camber varying flap member F forms the trailing portion of the wing under surface 11 of wing W, and lateral control surfaces or ailerons A, only one of which is shown in the drawings, are mounted in and form portions of the wing upper surface 10 above the under surface flap or flaps F at opposite sides of the wing or on opposite wings, as the case may be.

The flight operation and functioning of the type of wing W is familiar in the art, and may be either automatic in accordance with flight conditions or manually arbitrarily controlled by the pilot. With the wing in high speed and low attack angle flight, the flap F is raised to the full line position of Fig. 1 and carries out the normal or high speed contour of the wing, while the passage P inlet vane V is closed, being maintained in such position by the aid of the tension coil spring S, and the rearward displacement of air through passage P stopped. In the low speed or high angle of attack flight condition to increase wing lift capacity, the wing flap is swung downwardly and lowered from its normal position to one opening the rear discharge end of passage P and increasing wing under surface camber, while the forward inlet vane V is swung open against the force of spring S for rearward displacement of air through the wing passage P.

The trailing under flap F is suitably mounted for the desired vertical movement or swinging and it is not considered necessary to illustrate such a mounting in this instance, but, as an example, such a mounting can take the form shown in my U. S Patents 1,875,593 of September 6, 1932 and 1,916,475 of July 4, 1933.

The lateral control surfaces or ailerons A, one only of which is here illustrated, are located conventionally on a wing W or opposite wings, that is, at opposite sides of the fore and aft axis of the aircraft of which wing or wings W form a part, but are in this instance, mounted in and form trailing portions of the upper surface 10 of wing or wings W. Such ailerons A in their neutral control position, that is, the full line position of aileron A of Fig. 1, join with the flap or flaps F therebelow in the normal raised position of the latter, to carry out and define the normal airfoil section or contour of the trailing portion of a wing W, as well as to substantially close the trailing discharge end of wing passage P. In the example hereof, each aileron A is mounted for vertical swinging on a hinge or pivotal axis $a$ disposed longitudinally or spanwise of the aileron and located in the upper portion of the aileron adjacent but spaced a distance rearwardly from the leading edge of the aileron.

The lateral control surfaces or ailerons A of the wing W, so mounted and arranged thereon relative to the wing under flap or flaps F, are actuated for lateral control by a type of lateral control system (not shown) that obtains such control through mainly up movement or raising of an aileron, while the opposite aileron remains substantially without movement, or has a relatively very slight downward movement, from neutral controls positions. Any desired or suitable actuating mechanism or system can be employed for such lateral control operation of ailerons A, but as illustrative of possible arrangements of such type of lateral control system, reference is here made to my U. S. Patents 1,875,593 of September 6, 1932, and 1,992,157 of February 19, 1935.

With the types of lateral control systems referred to, there are certain problems of high aileron operating forces, which problems are discussed in my U. S. Patent 1,992,158 of February 19, 1935, and in which patent an arrangement of aileron aerodynamic balance is disclosed and claimed for reducing the high aileron operating forces so encountered. In my present invention in the form thereof of Figs. 1 and 2, I make use of the type of remote aileron aerodynamic balance of my Patent 1,992,158, by providing a balance unit for each aileron A that includes an aerodynamic balance member 20 preferably, although not necessarily of airfoil section, and a mounting therefor provided by spaced arms 21, only one of which is here shown, on an aileron by which the balance member is positioned at the under surface 11 of the wing W, remote from the aileron A.

The balance mounting arms 21 each is attached to the under forward portion of an aileron A and extends forwardly and downwardly therefrom through the wing and the under surface 11 thereof, such under surface being suitably slotted or cut away to receive each arm and permit the fore and aft movement thereof in operation. Each arm terminates at the under side of the wing with a forwardly extended section 22 that is substantially horizontally disposed with the aileron in neutral control position, and which is joined with arm 21 by a downwardly curved portion providing in effect a recess 21a at the upper side of the arm beneath the rear wing beam 14 for operating clearance when the arm is swung upwardly from neutral aileron position, as shown by the dotted line position of Fig. 2. The forward section 22 of each arm provides a mounting for receiving and supporting an end of the balance member 20, and for this purpose includes an upwardly extended forward end 22a with a series of vertically spaced bores therethrough, while a second series of vertically spaced bores are provided transversely through the rear end portion of section 22, as will be clear by reference to the drawings.

Thus, the spaced downwardly and forwardly extended balance member mounting arms 21 on each aileron A, provide by their forward sections 22, a support structure for receiving and adjustably mounting an aerodynamic balance member 20 thereon in position disposed across and between such spaced sections. A balance member 20 is mounted and supported from and extending between the balance arm sections 22 by suitably securing the leading and trailing portions of opposite ends thereof into the desired bores, respectively, of the arm sections, so that the balance member is given the desired vertical position on the arms and angle of attack relative to the wing. By such mounting the vertical position and/or the angle of attack of a balance member can be readily adjusted on the support arms 21 by supporting the member from the proper bores of the series in the sections 22 to obtain the desired adjusted position.

The under surface 11 of the wing W is provided with a slot or opening 11b for receiving and through which a balance member 20 for an aileron A may extend in certain positions of the aileron and balance. For instance, in the illustrated arrangement, the balance member 20 of an aileron A is swung upwardly by the support arms 21 through a wing under surface opening 11b into position within the wing with the trailing edge of member 20 disposed approximately at the wing under surface 11, when the aileron A is in its normal neutral position shown by full lines in Fig. 1. With the aileron A raised or deflected upwardly from neutral control position, the balance member 20 is swung downwardly by arms 21 through the wing opening 11b, to positions below the wing under surface, such as shown by the full line position of Fig. 2. The wing trailing under flap F is also provided with suitable slots as indicated in Figs. 1 and 2, for receiving the balance member support arms 21 when these arms are swung downwardly and forwardly by upward swinging or raising of an aileron, A.

The opposite ailerons A of a lateral control system are each operatively coupled into the operating mechanism of such system by a push-pull tube or its equivalent 25 which is pivotally connected to an arm 21 of the balance member mounting by a pivotal connection at 26. The lateral control system is of the type in which the ailerons A function for lateral control by mainly up movement with or without a slight down movement of an opposite aileron, and it is not considered necessary to completely disclose herein such a lateral control system, as the member 25 is to be considered as indicating such a system as of the type, for example, disclosed in my hereinbefore mentioned U. S. Patent 1,922,157.

If desired or found expedient, each aileron and balance unit is provided with means normally tending to maintain the ailerons of the system lowered, and such means can take the form of a tension coil spring 27, elastic cord or the like, attached to the wing structure and extending rearwardly within the wing from its point of attachment and connected at its rear end to the forward end of a cable 28 secured to a balance arm 21 of an aileron. Such a tension element 27, or plurality thereof if one is provided for each aileron of a system, is connected through a cable 28 to a point on the arm 21 so that force is applied to the arm tending to maintain the ailerons of the system lowered and the hinge moments stable, as well as performing certain other functions to be referred to hereinafter.

Flight operations have demonstrated that with a lateral control system which includes the lateral control surfaces or ailerons A in the upper surface of a wing and operated to obtain lateral control by mainly raising or upward deflection of an aileron, there are pressure differences established which create forces tending to cause a control surface or aileron A to adjust itself relative to the wing W. This movement of one of the control surfaces results in the tendency to move the entire control system from a neutral control position, all as previously explained herein, and in the form of my invention disclosed in Figs. 1 and 2, such forces are counteracted by utilizing the aerodynamic forces from the aileron balance members 20 to prevent or substantially reduce the resulting unstable movements of the control system.

With lateral control surfaces or ailerons A of the example of Figs. 1 and 2, the approximate free floating range upward without compensation is indicated by the dotted line position of aileron A in Fig. 1, for ordinary conditions of flight, and up to which indicated position an up load on the aileron may exist for certain conditions of flight. In accordance with my invention, the aerodynamic balance member 20 for an aileron A is so set as to present a positive angle of attack in relation to the wing within the range of movement imparted to the balance by the movement of the aileron through its indicated range of free floating. Thus, as shown in Fig. 1 of the drawings, with the aileron A in its full line neutral control position, its balance member 20 is positioned within the wing under surface opening 11b at a positive angle of attack, and as the aileron A moves or swings upwardly, the balance 20 moves downwardly from the wing under surface and maintains a positive angle of attack until the aileron A reaches the limit of its upward so-called free floating range indicated by the dotted line position of Fig. 1. In this latter position the balance member assumes approximately a 0° attack angle. The positive angle of attack of balance member 20 through the indicated range of movement results in the generation of a positive upward force by the reaction of the airflow on the balance, which upward force acts through arms 21 at the opposite side of the hinge from the upwardly acting force on the aileron A proper and thereby establishes a moment which opposes and counteracts the tendency for unstable control system movements during small displacements of the upwardly moving control surface.

As an aileron A moves upwardly and the balance member 20 moves downwardly toward the dotted line positions thereof shown in Fig. 1, any control system instability gradually dies out and then downward from this approximate dotted line position, the balance member 20 is no longer required to offset unstable control system movement by preventing upward movement of the aileron. This is so because from the approximate dotted line position of the aileron A in Fig. 1, the air force on the aileron tends to prevent its further upward movement and the magnitude of the aileron hinge moment may become so high as to call for a considerable effort by the pilot to fully operate the controls, particularly as the mechanical advantage of the control system may fall off as the control is fully raised. Thus, after an aileron A has been raised a predetermined amount, in the example hereof to the approximate dotted line position of Fig. 1, the angle of attack of the balance surface 20 relative to the airflow then changes so that the force resulting from the reaction of the airflow on the balance surface creates a force acting to aid in the operation of the controls to the full line positions of the aileron A and balance 20, as shown in Fig. 2.

A lateral control system may be employed with ailerons A which provides a highly differential control movement of opposite ailerons with the lateral control mainly obtained from the raised aileron, but only when the wing flap or flaps F are lowered, as explained in my above mentioned U. S. Patent 1,992,157 or both control surfaces or ailerons A could be simultaneously lowered and when in such lowered position operated for lateral control as referred to in such patent. I have indicated by the dotted line positions of aileron A, balance unit 20—21, and flap F in Fig. 2, such lowered positions, and it is to be noted that the design of the balance mounting arms 21 by which the downwardly curved portion 21a of an arm provides operating clearance for an arm with the wing beam 14 thereabove, permits such position of the arms without interference. In this connection it is to be noted that the spring 27 exerts a force acting on the balance unit that aids in carrying out the provision for movement of a wing flap F resulting in a readjustment of the control system.

As to the use of a tension or force means such as a spring 27, attention is directed to the fact that sufficient force may be applied thereby to counteract unstable tendencies in the control system, so that even the balance member 20, at least so far as lateral control system stability is concerned, may be eliminated. Or a combination of such force or spring means and the aerodynamic force means or balance member may be employed, in which the spring force is such as to permit a reduction in size of the balance member or the use of a less positive angle of attack setting of the balance member.

In the particular arrangement of the form of Figs. 1 and 2, the balance member 20 is of airfoil section and so adjusted on mounting arms 21 as to be positioned within the wing under surface opening 11b with its trailing edge substantially in line with the wing under surface, when the aileron A is in neutral control position and flap F is raised. However, by the provision for adjustment, a balance member 20 can be shifted bodily above or below such neutral control position, or even in alinement with the wing under surface 11. Also, the balance member may have other shapes than an airfoil section, such for example, as of flat plate, curved, or composite shapes or forms.

The aileron A of Figs. 1 and 2 is shown as provided with an optional air deflector plate 29 mounted along a portion of the aileron trailing edge in rigid position thereon extending upwardly and rearwardly therefrom. Such a plate is useful in lessening the effect of the aileron hinge moments that tend to produce lateral control system instability.

A lateral control system of the arrangement of Figs. 1 and 2 and embodying the principles of my invention as expressed by the balance members 20, and/or the tension force members 27, is thus rendered stable and those forces which under certain flight conditions tend to cause the movements of the ailerons from neutral positions and result in unstable movements of the control system, are effectively and efficiently counteracted and compensated for, so that lateral control stability is attained and maintained under all conditions of flight.

Figures 4, 5:
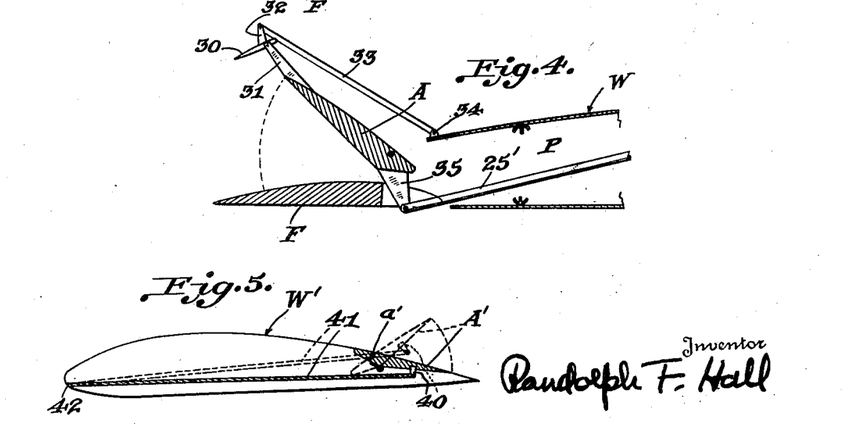
Fig. 4 is a view similar to Fig. 3, but showing the aileron and aerodynamic balance means in position with the aileron in a raised lateral control position.
Fig. 5 is a vertical transverse and purely diagrammatic sectional view through a wing having an upper surface aileron or lateral control surface of the type moved or deflected upwardly for lateral control and showing an arrangement of force means of the invention for counteracting and preventing movements of the aileron tending to render the control system unstable, in which such aileron is connected.

I have illustrated in Figs. 3 and 4 of the drawings, a different embodiment of the lateral control system principles of stabilization of my invention as expressed by the application of an aerodynamic force means to the lateral control surfaces or ailerons and operating system therefor of the type and mounted on a wing of the design, of Figs. 1 and 2. In the form of Figs. 3 and 4, each lateral control surface or aileron A of a wing W, is provided with and carries an aerodynamic balance member 30 positioned aft of or in proximity to the trailing edge and mounted for vertical swinging about a spanwise axis to vary the angle of attack of the member relative to the aileron and the airflow. A mounting for such balance member 30 may take the form of spaced arms or brackets 31, only one of which is shown in Figs. 3 and 4, fixed to the aileron A and extending rearwardly therefrom with the balance member pivotally mounted thereon and supported therebetween. Each aileron balance member 30 has an upwardly extended horn or crank 32 thereon and a fixed length link or tube 33 is pivotally connected between the horn 32 and a fixed pivot point 34 at the upper surface of the wing forward of aileron A.

The lateral control surfaces or ailerons A of Figs. 3 and 4 are each provided with a horn 35 extending downwardly and forwardly from the leading portion, and each of these aileron horns or cranks is pivotally connected with a push-pull tube 25', corresponding to the tube 25 of Figs. 1 and 2, forming portions of the aileron operating system. These lateral control surfaces or ailerons A and the operating members 25' coupled thereto, are representative of the type of lateral control system of Figs. 1 and 2 as explained in connection therewith, and in which lateral control is obtained by mainly up-movement of one of opposite ailerons A.

The aileron aerodynamic balance member 30 for each aileron A, is so arranged and mounted relative to the aileron and the fixed length link 33, that with the aileron in normal neutral control position, as shown by full lines in Fig. 3, the balance member has a negative angle of attack, so that the reaction of the airflow thereon sets up a hinge moment that opposes the hinge moment on the aileron tending to swing the aileron upwardly from its neutral position, and the required degree of stability for the control system into which the aileron is coupled, is maintained. The approximate range of movement of aileron A corresponding to the hereinbefore discussed "free floating" range is indicated by the dotted line position of Fig. 3, and the arrangement of a balance member 30 and link 33 pivotally coupled thereto, is such that the balance member maintains a negative angle to set up hinge moments opposing raising of the aileron throughout such range of movement. As an aileron A swings upwardly from the dotted line position of Fig. 3, to the maximum raised control position of Fig. 4, the balance member 30 is rotated by the fixed length link 33, to positive angle of attack so that the resulting forces from the airflow reaction act to assist in the operation of the control system to raise the aileron.

A balance member of the type and mounting of Figs. 3 and 4, thus functions to tend to maintain an aileron lowered or depressed through a relatively limited predetermined range of control surface movement, while beyond such range the balance member establishes forces that aid in the movement to control positions. As pointed out in connection with balance member 20 of Figs. 1 and 2, the rearwardly positioned balance 30 of the form of Figs. 3 and 4, acts on the aileron with considerable leverage so that the balance can be effectively of relatively small size or area. On the other hand the balance arrangement of Fig. 1 provides the advantage of a mass balance weight, as referred to and explained in my U. S. Patent 1,92,158, supra.

As an example of an application of the broad features of lateral control system stabilization of the invention, to a lateral control system of the general types referred to, with a wing of the conventional designs, I have shown such a wing W' in Fig. 5, with an aileron A' of the upper surface type with which lateral control is obtained by mainly up-movement of an aileron. While but one aileron A' is shown, it is understood that such showing is representative of a lateral control system having opposite aileron for lateral control. The aileron A' is mounted for vertical swinging about an axis $a'$, and is provided with a crank 40 depending therefrom within wing W', spaced rearwardly a distance from the aileron hinge axis $a'$. An elastic tension cord, spring, or equivalent element 41, is attached to the aileron crank 40, and extends forwardly through the wing to a fixed point 42 at the wing leading edge portion, at which point the member 41 is attached.

With the arrangement of force means 41 of Fig. 5 force is exerted on the aileron by such means tending to lower and maintain the aileron in neutral control position against raising or upward deflection through a range of upward movement until the aileron is raised a sufficient distance to locate the pulling force above the aileron hinge point $a'$. When the force applied by means 41 to the aileron A' is above the hinge axis $a'$, as shown by the raised dotted line position of the aileron in Fig. 5, then such force tends to raise the aileron and acts in aid of operation of the control system to swing an aileron to lateral control position. The action of a tension force member 41 on each aileron of a lateral control system thus opposes forces tending to unstabilize the system within the range of aileron movement in which such unstabilizing forces are encountered, while outside of such range, such members apply force aiding the control operation of the ailerons.

Figure 6:
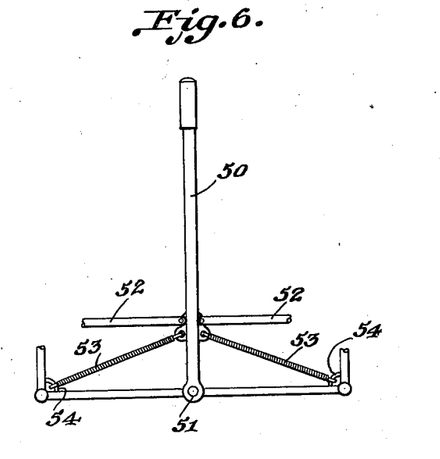
Fig. 6 is a view in elevation, more or less diagrammatic, of a pilot's control member or unit of the conventional stick type, with an arrangement of the invention, of force means directly associated with the control stick and exerting forces thereon opposing unstable stick movements.
Figure 7:
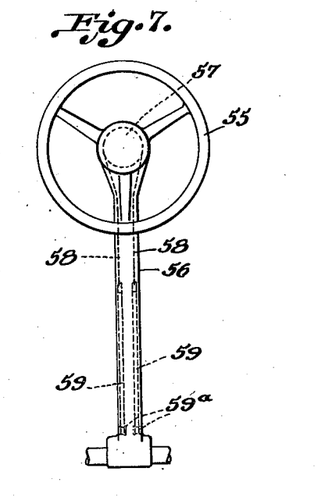
Fig. 7 is a view in elevation, more or less diagrammatic, of a pilot's control unit of the wheel type in which an arrangement of force means of the invention is shown for exerting forces opposing unstable control wheel movements that may be applied to the wheel by the lateral control system in which it is connected.

In the foregoing embodiments of my invention for obtaining lateral control system stability, the unstabilizing forces are counteracted and balanced at their source, but the invention also includes the application of the stabilizing forces at any point within the control surface operating system, such for example as an application of a direct force to the pilot's control member or unit, as illustrated in Figs. 6 and 7 of the drawings.

Referring to Fig. 6, I have more or less diagrammatically shown a pilot's control stick 50 pivotally mounted at 51 for lateral swinging in the usual manner, and having the push-pull members 52 pivotally connected to opposite sides thereof for operative coupling with aileron operating members such as 25 of Fig. 1, of a lateral control system. A rubber shock cord, coil tension spring, or equivalent force member 53 extends from each side of stick 50 to a connection 54 respectively, on suitable fixed structure of an aircraft. Thus, with opposite members 53 under initial tension, such members will tend to maintain the control stick 50 in neutral control position and will oppose and counteract unstable movements of the stick applied thereto through the push-pull members 52 from the ailerons of the control system. Force applied to the control stick corresponds to the force applied by the force member 27 of Fig. 1, and members 53 can be employed in a system in addition to members 27, or as substitutes therefor.

An application of a direct force to a pilot's control unit or member of the conventional wheel control types, is more or less diagrammatically shown in Fig. 7 of the drawings, in which the control wheel 55 is mounted and carried on a control column 56, and rotates a drum 57 for actuating a lateral control system in the usual manner familiar in the art. The cable 58 is wound about the wheel drum 57 and following my invention, elastic tension cords, coil spring or equivalent tension members 59 are attached between the opposite lengths of cable 58 and fixed connections 59a, respectively, at the base of the control column 56. Rotation of control wheel 55 will lengthen one tension force member 59 and shorten the other, and as the members 59 are under initial tension, together they function to restrain and counteract wheel movements and overcome unstabilizing forces applied to the control sytem.

In another form of means for stabilizing a lateral control system by applying forces thereto opposing and counteracting the unstabilizing forces tending to move the system, a friction force is interposed into the system at any suitable or desired point or points, for such stabilizing purposes. For example, in Figs. 8 and 9, such a friction force applying means is illustrated in the form of a coupling for connecting the pilot's control stick 50 to the opposite push-pull members or tubes 52 of the lateral control operating system.

Figure 8:
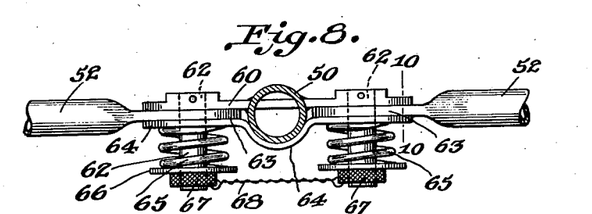
Fig. 8 is a view in top plan of an arrangement of the invention for applying friction force into a lateral control system to oppose and counteract movements of the system resulting from system instability, the arrangement being shown as applied into the system as the coupling between the pilot's control member and the push-pull members operated thereby.
Figure 9:
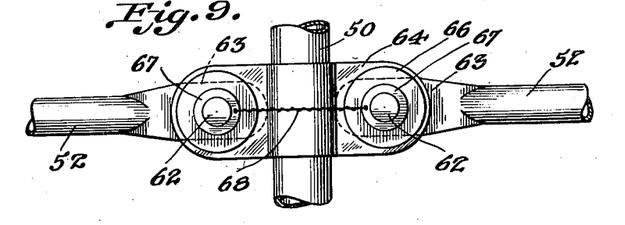
Fig. 9 is a view in elevation of the friction applying coupling arrangement of Fig. 8.
Figure 10:
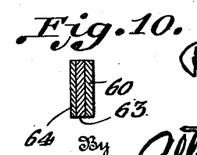
Fig. 10 is a detail section taken on the line 10—10, of Fig. 9.

Referring to Figs. 8 and 9, the control stick 50 is provided with a plate member 60 fixed thereto in horizontally disposed position and extending thereacross, outwardly beyond the stick at opposite lateral sides thereof. The plate member 60 is provided at its opposite ends with the transversely disposed studs 62, respectively, extending from one side of the plate and fixed in position thereon and therein, as clearly shown by Fig. 8 of the drawings. The ends 63 of the opposite push-pull members 52 of the lateral control system are flattened and are formed with circular bores therethrough for receiving and fitting over the studs 62, respectively, at opposite sides of the control stick 50. A friction plate 64 extends across and between the studs 62, and is shaped to fit against and across stick 50 intermediate the studs. (See Fig. 8.) The opposite ends of friction plate 64 are provided with bores which fit over and through which studs 62, respectively, extend, while such plate opposite ends present inner surfaces bearing against and covering the adjacent faces of the flattened ends 63 of the push-pull members 52. The inner faces or surfaces of the opposite end portions of friction plate 64 are formed of a suitable friction material, or the plate itself may be formed of a material suitable for the purpose; in this connection no special material being necessarily required as metal to metal friction can be used if desired.

The opposite ends of the friction plate 64 are maintained under pressure against and in frictional engagement with the flattened ends 63 of the opposite push-pull members 52, respectively, by the coil compression springs 65, respectively, mounted on and over the studs 62, and maintained under compression between the friction plate and washers 66 on the studs at the outer ends of the springs, by the knurled nuts 67 threaded onto the ends of the studs. The required degree or magnitude of frictional force applied to the friction plates by the springs 65, is adjustable or variable by screwing the nuts 67 on the studs 62 to increase or decrease the compression of the springs between washers 66 and the friction plate. If desired, the adjusting nuts 67 can be tied together in adjusted positions against displacement, by the safety wire 68; or such nuts may be left free for quick adjustment in flight.

The push-pull tubes 52 are vertically pivotally mounted at opposite sides of the control stick 50 on the studs 62 carried by the stick, but are normally held against swinging or vertical rotation on these studs by the frictional force with which they are held between plate member 60 and the friction plate 64 under the action of compression springs 65. Thus, until a force is applied to a push-pull member 52 of sufficient magnitude to overcome such frictional force in the coupling of the member to stick 50, a push-pull member cannot be rocked vertically about its stud 62, and the control stick is held against lateral movement. In this manner the frictional force opposes unstabilizing forces applied to the control system tending to move the control stick, and results in maintaining stability of the control surface against the conditions hereinbefore discussed and explained. It is understood, of course, that the area of the engaged surfaces of the push-pull member ends 63 and the friction plate 64, together with the force exerted thereon by springs 65, is such as to overcome the unstabilizing forced acting to rotate the push-pull members 52 on their studs 62.

The frictional force applying means of the form of Figs. 8 and 9, applies such force at the points of connection of members 52 to the control stick or unit 50, but such a force can be applied to but one of such points, or can be applied at a single point or plurality of points anywhere in a lateral control system and there is not intention of limiting the invention to the application of the force as shown in the illustrated example. Also, the invention includes the application of a frictional force to a lateral control system in combination with an aerodynamic force system or with the direct tension force of the examples hereinbefore explained or by a combination of all such forces in a single lateral control system.

In the types of lateral control surfaces or ailerons A and A' presented by the examples of Figs. 1 to 5, such ailerons are mounted in the upper surface of a wing for up-movement for control, but my invention is in no sense limited to such types, and it is to be understood that the lateral control surfaces may be of the type mounted in either upper or lower surface of a wing, or adjacent or in proximity to either surface thereof, or can be mounted in or adjacent any aircraft surface, by which latter term is included not only wings, but control surfaces as well. The specific type of wing of the referred to examples of Figs. 1 to 4 is not shown by way of limitation in connection with the forms of the invention applied thereto, but any form of wing is included as indicated by the conventional type of Fig. 5.

It is also evident that various other forms, designs, arrangements, and combinations might be resorted to without departing from the spirit and the broad scope of my invention, and hence, I do not desire to limit myself in all respects to the exact and specific disclosures hereof.

What I claim is:

1. In an aircraft lateral control system, a pilot's control member movable to actuate the system for lateral control, a plate carried by said member and provided with a transversely disposed stud extending in fixed position from one side face of the plate, a push-pull member having a flattened end portion pivotally mounted on said stud and bearing against the adjacent face of the plate, a friction plate fitted over the stud and frictionally engaging the side face of the flattened push-pull member end opposite said plate, and a compression spring mounted on the stud and forcing the friction plate against the flattened end of the push-pull member to maintain the latter frictionally held between said stud plate and friction plate whereby rotation of the push-pull member on the stud is resisted.

2. In an aircraft lateral control system, a pilot's control member movable to actuate the system for lateral control, said system including operating members pivotally connected to and extending from opposite sides of the pilot's control member, and the pivotal connection of each push-pull member with the pilot's control member including friction applying means establishing forces resisting pivoting between said members.

3. In an aircraft control system, a control surface of the type mounted at one side of an aircraft surface for movement mainly in one direction relative to the aircraft surface for control functioning, pilot actuated mechanism for moving said control surface between neutral and control positions of the control surface, stabilizing means associated with the control surface and pilot actuated mechanism, and said stabilizing means constructed and arranged to apply forces to the control surface in a direction opposing movement of the control surface from neutral control position, and said stabilizing means being operated by the movement of the control surface by said pilot actuated mechanism to remove such opposing forces after the control surface has moved a predetermined distance from neutral control position in the control direction.

4. The combination with a lateral control system for aircraft of the type that includes opposite lateral control surfaces mounted at one side of an aircraft surface and operable for lateral control by moving either one of said control surfaces in a direction away from the aircraft surface, of stabilizing means connected with and controlled by movement of said control surfaces, said stabilizing means constructed and arranged to apply forces to a control surface opposing movement thereof in the control direction from neutral position through a predetermined portion of the range of control surface movements, and to be controlled by the movement of a control surface to apply such forces to the control surface in the reverse direction upon movement of the control surface in the control direction beyond said portion of the range of movement.

5. In combination, an aircraft control system including an aircraft control surface mounted for swinging movement between neutral and control positions, force means connected with said control surface for applying forces thereto tending to swing the surface about its axis, said force means adapted to be moved by the swinging of the control surface to positions at which the forces applied thereby tend to swing the surface in reverse directions, respectively, about its axis, the force means constructed and arranged so that with the control surface in neutral position forces will be applied thereby to the control surface opposing swinging of the surface in a control direction from neutral, and so that swinging of the control surface in the control direction beyond a predetermined position will move the force means to position reversing the swinging forces applied to the control surface to a direction aiding swinging of the surface in the control direction, and pilot actuated means for swinging said control surface between neutral and control positions.

6. In combination, an aircraft surface, a lateral control member mounted at one side of said surface and swingable from neutral position to control positions in a direction away from the surface, force means connected with said control member and applying forces thereto opposing swinging thereof from neutral position in the control direction for a predetermined portion of the full range of swing of such member, said force means controlled by the swinging of said control member and so constructed and arranged that upon swinging of the control member beyond said predetermined portion of the range of swing the force means will apply forces in a direction tending to swing the control member in the control direction away from the surface, and pilot actuated control mechanism for arbitrarily swinging said control member.

7. In combination, an aircraft control surface mounted for swinging movement between neutral and control positions, force means connected with and movable by said control surface for applying forces thereto tending to swing the surface about its axis, said force means constructed and arranged to be positioned by the control surface when in neutral position so as to apply forces in a direction relative to the axis of the surface tending to oppose swinging of the surface from neutral, and to be repositioned by swinging of said surface from neutral so as to apply forces to the surface relative to its axis tending to swing the surface in a direction from neutral toward control positions, and pilot mechanism for arbitrarily swinging said control surface between neutral and control positions.

8. In combination, a movable aircraft control surface, an aerodynamic balance therefor adapted to be acted upon by the airflow and moved relative to the airflow by said control surface, and said balance so constructed and arranged as to be positioned relative to the airflow by said control surface when in neutral position so that the reaction of the airflow creates a force acting on the control surface to oppose movement of said surface from neutral control position.

9. In combination, a movable aircraft control surface, an aerodynamic balance therefor adapted to be acted upon by the airflow, said balance including means operatively connecting the balance with the control surface whereby movement of the latter changes the position of said balance relative to the airflow and to the axis of movement of the control surface, said balance so constructed and arranged as to be positioned relative to the airflow and the axis of the control surface when such surface is in neutral control position so that the forces applied to the control surface by the air reaction on said member will act to oppose movement of the control surface from neutral, and so as to be repositioned relative to the airflow and the axis of the control member upon arbitrary movement of the control surface from neutral through a predetermined range of movement so that the forces applied will act in the reverse direction to aid movement of the surface in the control direction.

10. In combination, an aircraft control surface movable mainly in one direction from neutral position for control functioning, an aerodynamic balance adapted to be acted upon by the airflow, said balance operatively associated with and movable by the control surface, and said balance so constructed and arranged as to be positioned by the control surface when the latter is in neutral position and is moved through a portion of the range of movement from neutral, to present an angle to the airflow such that the resulting forces will be applied to the control surface in a direction opposing movement of such surface from neutral.

11. In combination, an aircraft control surface mounted for swinging between neutral and control positions, an aerodynamic balance adapted to be acted upon by the airflow and associated and movable with said control surface, said balance so constructed and arranged that with the control surface in neutral and through a predetermined portion of the full range of swing of the control surface from neutral the balance will present an angle of attack to the airflow such that the forces created will be applied to the control surface relative to its axis of swing in a direction to oppose movement thereof in a direction from neutral, and so that when said control surface is moved in the control direction beyond such predetermined portion of the range of movement, the balance will be repositioned to present an angle to the airflow such that the resultant forces will be applied to the control surface relative to its axis in a reverse direction to aid movement of the surface in the control direction.

12. In combination, an aircraft surface, a control member swingably mounted at one side of said surface for movement away from the surface to control positions, an aerodynamic balance movable with said control member and adapted to be acted upon by the airflow to apply swinging forces to the member, said balance so constructed and arranged as to be positioned by the member when in neutral position to present an angle to the airflow such that the balance will tend to move toward the surface to apply forces to the member in a direction opposing movement of the member from the aircraft surface, and so as to be moved by the member when swung in the control direction to change the angle relative to the airflow to an angle such that the balance will tend to move from the surface and will reverse the direction of the swinging forces applied thereby to the control member.

13. In combination, an aircraft surface, a lateral control surface movably mounted at one side thereof for movement away from the surface for control, an aerodynamic balance member pivotally mounted and supported on said control surface to present an angle of attack to the airflow past the surface, a constant length member pivotally connected between said balance member and a fixed point on said aircraft surface, said balance member adapted to be rotated by said constant length member as the control surface is moved for control to vary the angle of attack of said balance member, the balance member arranged relative to the control surface to present an angle of attack creating forces opposing control movement away from said surface through a predetermined portion of the range of control surface movement, and said constant length member adapted to rotate the balance member to an angle of attack creating forces reversed in direction to aid further movement of the control surface beyond such predetermined portion of the range of movement of such surface.

14. In combination, an aircraft surface, a control member located at one side of said surface, said member mounted for swinging from neutral position outwardly from the surface for control, an aerodynamic balance located at the opposite side of the surface and adapted to be acted upon by the airflow, said balance operatively associated with the control member whereby the balance is swung outwardly from the surface by outward swinging of the control member in the control direction, said balance so constructed and arranged as to be positioned at an angle of attack to the airflow when the control member is in neutral position to develop a lift that will apply swinging forces to the member opposing outward swinging in the control direction, and so as to be moved to change its angle relative to the airflow to develop a lift that will reverse the direction of swinging force applied thereby to the control member, upon continued outward swinging of the control member.

15. In combination, a wing, a lateral control surface at the upper side of the wing removed from the under side thereof, said control surface mounted for upward swinging from neutral position to control positions, an areodynamic balance located at the under side of the wing and adapted to be acted upon by the airflow, said balance operatively associated with the control surface whereby the balance is swung toward and from the wing by swinging of the control surface, said balance so constructed and arranged as to be positioned by the control surface in neutral position to present an angle of attack that will create a positive lift to raise the balance and apply forces to the surface tending to swing the surface downwardly, and upon arbitrary swinging of the control surface upwardly in the control direction to swing the balance to an angle of attack at which the airflow will react to create a minus lift to swing the balance downwardly and swing the control surface upwardly in the control direction.

16. In an aircraft control, an aircraft surface, a control member swingably mounted at one side of the aircraft surface for movement away from the surface for control, a tension element connected between said control member and a fixed point on the aircraft surface, so constructed and arranged that the point of connection thereof to the control member relative to the axis of the latter is such that a swinging force will be exerted on the member in a direction opposing swinging of the control member from the surface, and the point of connection of said element relative to the axis of the control member will be moved by continued outward swinging of the member to a location that will reverse the direction of the swinging forces applied to the control member.

17. In an aircraft control, an aircraft surface, a control member swingably mounted at one side of the aircraft surface for movement outwardly from the surface for control, a tension element connected between a fixed point on the aircraft surface and a point at one side of the axis of said control member to exert a force opposing outward swinging of the member from the surface, and said tension element so constructed and arranged that continued outward swinging of the control member will move the point of connection of the tension element to the opposite side of the member axis so that the direction of the swinging forces applied to the control member will be reversed.

18. An aircraft lateral control system including, lateral control surfaces mounted at one side of an aircraft surface and selectively alternately movable for lateral control in a direction away from the aircraft surface, mechanism for moving said control surfaces, a pilot's control member coupled with and for actuating said mechanism, and a force exerting means directly connected to said control member and constructed and arranged to continuously apply forces thereto and to said mechanism opposing movement of the control member and mechanism from neutral control position caused by forces applied to the mechanism by the tendency of said lateral control surfaces to aerodynamically move from neutral control positions.

19. In an aircraft control system that includes movably mounted lateral control surfaces, a pilot actuated control operating unit, and operative connections between said unit and the control surfaces, separate means incorporated into the said system adapted to apply friction forces therein of a magnitude to continuously oppose movements of the system from neutral control position caused by the tendency of the control surfaces to move from neutral positions under the action of aerodynamic forces, and said friction force applying means constructed and arranged to be overcome by arbitrary pilot operation of the control system.

20. In an aircraft lateral control system that includes movably mounted lateral control surfaces, a pilot actuated control operating unit, and operative connections between said unit and the control surfaces, friction generating means incorporated into the control system and constructed and arranged to apply friction forces therein of a magnitude to continuously oppose movements of the system from neutral control position, mechanism for varying the magnitude of the friction force applied by said means, and the pilot's control unit operable for control movement of the system by applying forces of greater magnitude than that of the friction force applied by said means.

21. In an aircraft, in combination, a lift surface, a lateral control system for the aircraft of the type in which a control surface is moved mainly in one direction for lateral control, said system including lateral control surfaces on said lift surface at opposite sides, respectively, of the longitudinal axis of the aircraft, each of said control surfaces disposed at the upper side of the lift surface removed from the lower side thereof and hingedly mounted for upward swinging from neutral position to lateral control position projected from the upper side of said lift surface, pilot operated control mechanism coupled with said opposite lateral control surfaces for positively and selectively swinging either of said control surfaces upwardly from neutral in the control direction to projected position for lateral control, force applying means separate from said lateral control surfaces and from the control mechanism therefor but associated therewith to react externally thereof to apply forces to the control surfaces and control mechanism, and said force applying means constructed and arranged to apply forces to the control surfaces and operating mechanism in a direction to solely oppose movements of a control surface in the control direction from neutral caused by the action of the aerodynamic forces that tend to move such a control surface in the direction in which moved by said control actuating mechanism.

22. In combination, an aircraft lift surface, a control surface positioned at the upper side of said lift surface removed from the lower side thereof and mounted for vertical swinging for control functioning mainly in an upward direction from neutral position at the upper side of the lift surface, pilot operated mechanism for positively swinging said control surface upwardly from the lift surface in the control direction, force applying means separate from said control surface and actuating mechanism but operatively associated therewith to react externally thereof and apply forces to the control surface and its actuating mechanism, and the said force applying means constructed and arranged to apply forces to the control surface and actuating mechanism in a direction to solely oppose movements of the control surface and actuating mechanism in the control direction from neutral caused by the action of the aerodynamic forces which tend to move such a control surface and actuating mechanism in the control direction from neutral position.

RANDOLPH F. HALL.